(12) United States Patent
Tsilevich

(10) Patent No.: US 6,960,308 B1
(45) Date of Patent: Nov. 1, 2005

(54) ENDOTHERMIC HEAT SHIELD COMPOSITION AND METHOD FOR THE PREPARATION THEREOF

(76) Inventor: Maoz Betzer Tsilevich, 110 Menahem Avatichi St., Moshav Mishmar Hashivah 50297 (IL)

(*) Notice: Subject to any disclaimer, the term of this patent is extended or adjusted under 35 U.S.C. 154(b) by 0 days.

(21) Appl. No.: 09/544,142

(22) Filed: Apr. 6, 2000

(30) Foreign Application Priority Data

Jul. 7, 1999 (IL) .................................. 130883

(51) Int. Cl.$^7$ ..................... E04B 1/76; C09K 21/02; C09K 21/10; C09K 21/14; B27N 9/00

(52) U.S. Cl. ................. 252/62; 252/606; 252/607; 252/609; 252/378 R; 106/18.22; 106/18.13; 106/18.23; 106/211.1; 106/213.1; 523/179; 428/920; 428/921

(58) Field of Search ............... 252/606, 607, 252/609, 62, 378 R; 106/18.22, 18.23, 18.13, 18.21, 18.26, 18.33, 18.34, 211.1, 213.1, 214.2; 523/179; 524/405, 413, 421, 423, 437; 428/920, 921

(56) References Cited

U.S. PATENT DOCUMENTS

| | | | | |
|---|---|---|---|---|
| 3,868,346 A | * | 2/1975 | Memill | |
| 3,935,343 A | * | 1/1976 | Nuttall | 427/393 |
| 3,986,969 A | * | 10/1976 | Telkes | 252/70 |
| 4,122,059 A | | 10/1978 | Hansen | 260/37 EP |
| 4,146,673 A | * | 3/1979 | Saeman et al. | 428/403 |
| 4,172,744 A | | 10/1979 | Ishikawa | 156/79 |
| 4,209,413 A | * | 6/1980 | Kent et al. | 252/70 |
| 4,272,744 A | | 6/1981 | Schuegraf | 333/249 |
| 4,277,357 A | * | 7/1981 | Boardman | 252/70 |
| 4,288,338 A | * | 9/1981 | Phillips | 252/70 |
| 4,338,098 A | * | 7/1982 | Yamaji | 44/251 |
| 4,371,028 A | * | 2/1983 | Helshoj | 165/10 |
| 4,462,831 A | | 7/1984 | Raevsky et al. | 106/18.26 |
| 4,585,572 A | * | 4/1986 | Lane et al. | 252/70 |
| 4,632,865 A | * | 12/1986 | Tzur | 428/304.4 |
| 4,637,888 A | * | 1/1987 | Lane et al. | 252/70 |
| 4,780,114 A | * | 10/1988 | Quinn et al. | 55/16 |
| 4,814,371 A | | 3/1989 | Le Touche | 524/405 |
| 4,923,077 A | * | 5/1990 | Van Iperen et al. | 220/3.1 |
| 5,082,877 A | | 1/1992 | Raevsky et al. | 523/179 |
| 5,104,917 A | | 4/1992 | Raevsky | 524/71 |
| 5,206,088 A | * | 4/1993 | Raevsky | 428/413 |
| 5,270,105 A | * | 12/1993 | Conroy et al. | 428/278 |
| 6,241,909 B1 | * | 6/2001 | Hayes | 252/70 |

FOREIGN PATENT DOCUMENTS

| | | |
|---|---|---|
| CA | 2228479 | 2/1997 |
| DE | 24 51 792 | 5/1976 |
| DE | 31 42 096 A1 | 11/1983 |
| IL | 73138 | 2/1984 |
| JP | 55133477 | 3/1979 |
| JP | 4096987 | 8/1990 |

* cited by examiner

Primary Examiner—Joseph D. Anthony

(57) ABSTRACT

A method for preparing an endothermic heat shield composition, which comprises at least 50 wt/wt % hydrated salt and at least one filler material, the method comprising the steps of:

a) heating the hydrated salt to a temperature at which it liquifies;
b) adding and mixing at least one filler material into a); and cooling the mixture to form a composition wherein the hydrated salt particles are fused to each other, with the proviso that said at least one filler material is a mixture of organic and inorganic materials.

12 Claims, 1 Drawing Sheet

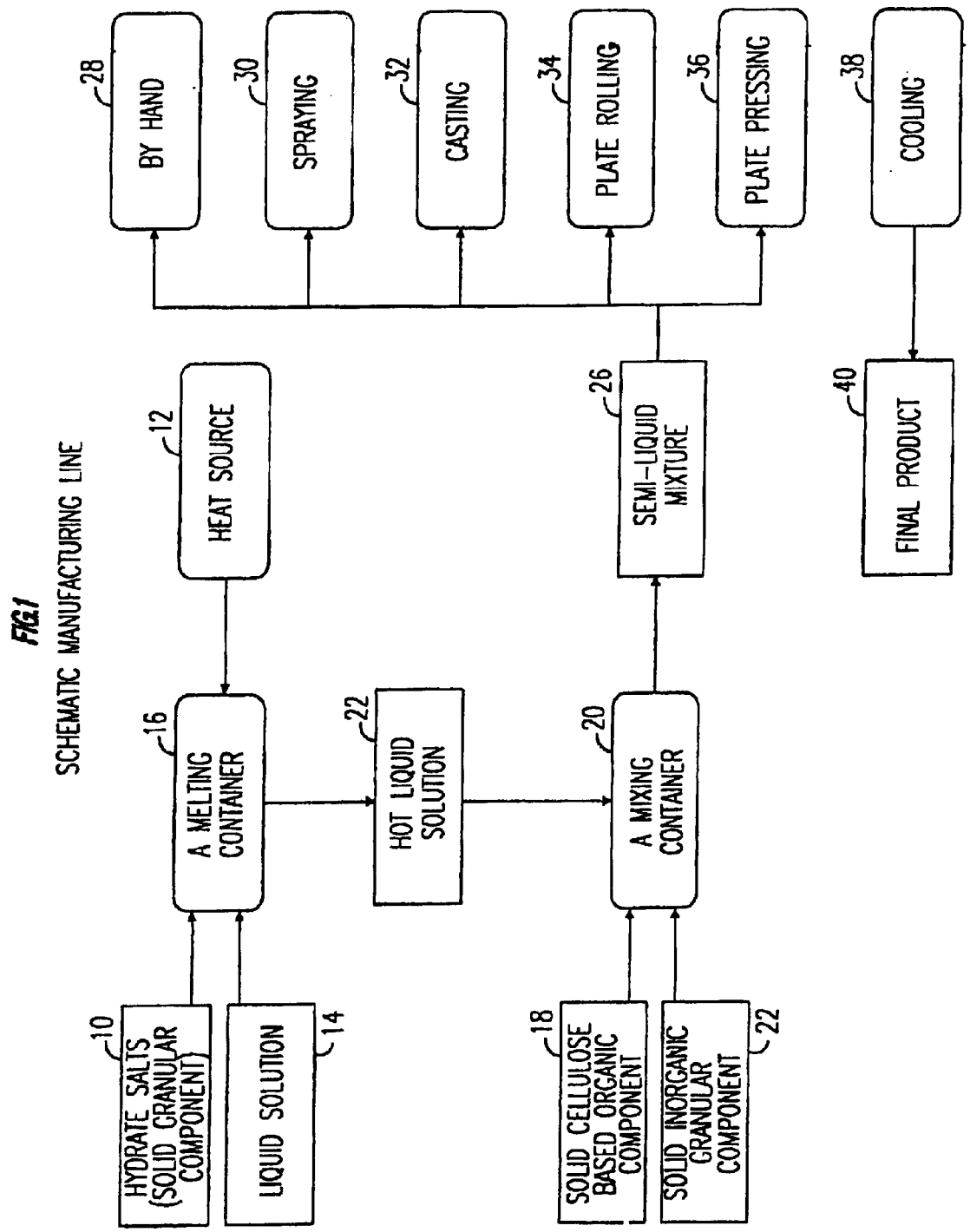

ENDOTHERMIC HEAT SHIELD COMPOSITION AND METHOD FOR THE PREPARATION THEREOF

FIELD OF INVENTION

The present invention relates to an endothermic heat shield composition and a method for the preparation thereof. More specifically, the present invention provides an endothermic heat shield composition, comprising at least 50 wt/wt % hydrated salt and at least one filler material, wherein the salt is in the form of hydrated salt particles which are fused to each other.

BACKGROUND OF THE INVENTION

Prior art publications disclose intumescent and/or endothermic heat shield compositions containing hydrated salts. However, the hydrated salts therein are in aggregate form and do not have a chemical relationship (a fused relationship), with the surrounding salts. In order to contain the hydrated salts within these compositions, the prior art utilizes various binder materials for holding the hydrated salt aggregates together, thereby forming a solid composition. Furthermore, since the hydrate salt aggregates do not have a fused relationship, the grain size of the hydrated salts disclosed by the prior art is of importance. Moreover, as will become evident from the discussion below, the prior art does not disclose heating the hydrated salts during preparation to a temperature at which they become liquid.

U.S. Pat. No. 5,082,877 discloses an ablative protective composition containing a polymeric binder component and an ablative component. The above patent requires the presence of a binder in addition to limiting the temperature at which the process of preparation is carried out. In column 6, lines 54–60 of this patent, it is stated "When preparing the novel heat/fire protective material, it is critical that the temperatures employed during preparation do not result in the decomposition of the aluminum sulfate hydrate. As stated earlier, according to CRC Handbook of Chemistry and Physics, $57^{th}$ ed., aluminum sulfate hydrate decomposes at 86.5° C. As such, if processing temperatures exceed 86.5° C. the heat/fire protective properties of the resulting composition will significantly diminish." In contrast to U.S. Pat. No. 5,082,877, the present invention utilizes temperatures exceeding 86° C. (in the case of aluminum sulfate hydrate), and does not require binders for holding the salt grains together.

U.S. Pat. No. 4,632,865 describes and claims an insulation material for use in heat protective devices which comprises a structure having two or more layers, arranged so that the external layer has a higher melting temperature or temperature of dehydration than any layer, the external layer comprising:

an inorganic salt selected from the group consisting of $Al_2(SO_4)_3.16$–$18H_2O$, $Kal(SO_4)_2. 12H_2O$, and $MgSO_4.7H_2O$, and a binder selected from the group consisting of natural rubber, neoprene rubber, silicone rubber, polyester resin, epoxy resin, phenolic resin and hydraulic cement.

U.S. Pat. No. 4,632,865 specifies that the temperature for preparing the above material should not exceed the hydration temperature.

U.S. Pat. No. 4,462,831 discloses a non-refractory ablative, fire- and heat-protection material for a one time use, comprising an organic binder selected from the group consisting of natural and synthetic polymers, rubbers, natural and synthetic resins, natural and synthetic asphalts and bitumens including latexes, solutions of the above substances or mixtures thereof, and a filler consisting of hydrated aluminum sulfate of the general formula $Al_2(SO_4)_3. nH_2O$ wherein n=14–18 in an amount of more than 75% by weight of the material, the filler being free of any cementitious material.

U.S. Pat. No. 4,122,059 discloses a composition of matter, including a mixture of fire-resistant materials, which mixture comprises a hydraulic cement and an inorganic salt hydrate selected from the group consisting of aluminum sulfate hydrate and ferrous sulfate hydrate and which mixture has been uniformly distributed in a synthetic, organic polymer and which mixture comprises from about 5% to about 80% by weight of said hydrated salt, from about 1% to about 10% by weight of a hydraulic cement, and about 1% to about 10% of aluminum silica, the percentages being based upon the total weight of said mixture.

The above patent states that "The powders when exposed to flame or heat convert to refractory substances. Water from the hydrate is driven off into contact with the cement with the resulting setting of the cement . . . ". U.S. Pat. No. 4,122,059 requires the cement to act as a binder since there is no chemical relationship between the inorganic salt hydrates. Furthermore, it should be noted that the conversion of the powders into refractory substances does not occur during the manufacturing process, but rather during an event of fire.

In U.S. Pat. No. 5,104,917 heat ablative compositions are described and claimed which comprise a binder and a filler, including a combination of aluminum sulfate hydrate and aluminum ammonium sulfate hydrate. The combination produces a synergistic effect on the fire protection rating of the composition. The binder may be chosen from inorganic or organic binders. Examples of binders according to the above patent are natural and synthetic rubbers.

The above patent further states that "The acidic character of aluminum sulfate hydrate has numerous consequences on the performance of the heat ablative composition. The acidity may cause the destruction of the binder, which results in decreased F.P.R.'s. Aluminum sulfate hydrate's acidity may also result in cracking, brittleness and total loss of impact resistance of the binder, and loss of tensile strength, compressive strength or bending strength in the finished ablative product. The excess acidity may result in erosion or destruction by oxidation of the substructure to which the ablative composition is applied."

In contrast to the above, the stability of the composition according to the present invention is based on the mechanical strength, which results from the bonds within the crystal/fused structure of the hydrate salt. The filler component of the present invention is stable and does not chemically react with the hydrate salt.

Canadian patent 2,228,479 describes and claims a fireproof sealing system based on molten adhesives, containing a) a molten adhesive; b) binders; c) substances forming a carbon structure in the event of a fire; d) flame-protecting agents; and e) a component which swells in the event of a fire; and a process for the flameproof sealing of objects or apertures by the application of such sealing systems.

The above patent utilizes heat to melt the thermoplastic components which function as binders.

As shown above, the prior art does not teach a heat shield material in which the hydrated salt particles are fused to each other. Thus, in accordance with the prior art, binder materials are needed for holding the hydrated salt particles together.

It is therefore an object of the present invention to provide a new and improved heat shield composition and method for producing the same which overcomes the disadvantages of the prior art which necessitate the utilization of binder materials. In contrast to the prior art, the present invention utilizes the crystal formation of the hydrated salt in combination with waste products. The elimination of binder materials significantly reduces the manufacturing cost of the heat shield composition.

Thus, according to the present invention, an endothermic heat shield composition is provided, comprising at least 50 wt/wt % hydrated salt and at least one filler material, wherein the hydrated salt particles are fused to each other, wherein said fused state is formed as a result of the heating of the hydrated salt to at least the temperature at which said salt is in liquid form and the subsequent cooling thereof.

According to the present invention, the hydrated salts are selected from the group consisting of $Al_2(SO_4).16-18H_2O$; $NH_4Fe(SO_4)_2.12H_2O$; $Na_2B_4O_7.10H_2O$; $NaAl(SO_4)_2.12H_2O$; $AlNH_4(SO_4)_2.12-24H_2O$; $Na_2SO_4.10H_2O$; $MgSO_4.7H_2O$; $(NH_4)_2SO_4.12H_2O$; $KAl(SO_4)_2.12H_2O$; $Na_2SiO_3.9H_2O$; $Mg(NO_2)_2.6H_2O$; $NaNO_2$; $Na_2CO_3.7H_2O$; and mixtures thereof.

In a further preferred embodiment, the present invention provides an endothermic heat shield composition, wherein at least 50% of the hydrated salt is hydrated aluminum sulfate. This sulfate is easy to obtain and is relatively inexpensive.

In a preferred embodiment, the filler material is a material selected from the group consisting of an organic component and an inorganic component and mixtures thereof.

In an even further preferred embodiment, the organic component is a solid cellulose-based component. Specifically, the solid cellulose-based component is selected from the group consisting of wood particles and paper particles.

In the present invention, the solid cellulose-based component is preferably present in an, amount ranging from about 5 wt/wt % to 30 wt/wt %.

In another preferred embodiment, the inorganic component is inert, highly porous and light weight. Specifically, the inorganic component is Vermiculite or Perlit and is preferably present in an amount ranging from about 5 wt/wt % to 30 wt/wt %. It should be noted that other porous solid volcanic materials can be used in accordance with the present invention.

The present invention also provides an endothermic heat shield composition, wherein the organic component is sugar molasses preferably present in an amount of up to 20 wt/wt %.

In a further preferred embodiment, the inorganic component may be glass fibers or ceramic fibers which are preferably present in an amount of up to 10 wt/wt %.

In another preferred embodiment, the inorganic component is selected from the group consisting of titanium dioxide, magnesium oxide and aluminum oxide which is preferably present in an amount of up to 30 wt/wt %.

In another aspect of the present invention, a method is provided for preparing an endothermic heat shield composition, which comprises at least 50 wt/wt % hydrated salt and at least one filler material, the method comprising the steps of:
  a) heating the hydrated salt to the temperature at which it liquefies;
  b) adding at least one filler material; and
  c) cooling the mixture to form a composition wherein the hydrated salt particles are fused to each other.

In this aspect of the present invention, there is provided a method, wherein the hydrated salt is selected from the group consisting of $Al_2(SO_4).16-18H_2O$; $NH_4Fe(SO_4)_2.12H_2O$; $Na_2B_4O_7.10H_2O$; $NaAl(SO_4)_2.12H_2O$; $AlNH_4(SO_4)_2.12-24H_2O$; $Na_2SO_4.10H_2O$; $MgSO_4.7H_2O$; $(NH_4)_2SO_4.12H_2O$; $KAl(SO_4)_2.12H_2O$; $Na_2SiO_3.9H_2O$; $Mg(NO_2)_2.6H_2O$; $NaNO_2$; $Na_2CO_3.7H_2O$; and mixtures thereof.

In a most preferred embodiment of this aspect of the present invention, at least 50% of the hydrated salt is hydrated aluminum sulfate.

In a preferred method of this aspect of the present invention, the filler material is a material selected from the group consisting of an organic component and an inorganic component.

In another preferred method of this aspect of the present invention, the organic component is a solid cellulose-based component. Specifically, the solid cellulose-based component is selected from the group consisting of wood particles and paper particles. The cellulose-based component is preferably present in an amount ranging from about 5 wt/wt % to 30 wt/wt %.

In another preferred method according to this aspect of the present invention, the inorganic component is inert, highly porous and light weight. Specifically, the inorganic component is Vermiculite or Perlit and is preferably present in an amount ranging from about 5 wt/wt % to 30 wt/wt %.

In an even further preferred method of this aspect of the present invention, the organic component is sugar molasses preferably present in an amount of up to 20 wt/wt %.

In a further preferred embodiment method of this aspect of the present invention, the inorganic component may glass fibers or ceramic fibers which are preferably present in an amount of up to 10 wt/wt %.

In another preferred embodiment method of this aspect of the present, invention, the inorganic component is selected from the group consisting of titanium dioxide, magnesium oxide and aluminum oxide which is preferably present in an amount of up to 30 wt/wt %.

In a preferred method of this aspect of the present invention, a further step is provided for adding up to about 10 wt/wt % of water to the hydrated salt prior to heating.

The composition of the present invention contains a filler which is trapped within the fused structure of the hydrated salt. The function of the filler is important when the composition is exposed to high temperatures, since the filler assists the composition in retaining its solidified state and not reverting back to the liquid state it possessed during preparation.

In the present invention, preferable fillers are cellulose-based, such as wood or paper particles since they exhibit high absorption properties.

Most of the compositions of the material of the present invention also have intumescent properties, in addition to endothermic properties.

An intumescent composition, when heated to the temperature at which the agent intumesces, results in the composition expanding many times its original volume, forming a charred layer which provides a protective barrier from the source of the heat, as well as from the heat itself.

The combination of intumescent and endothermic properties is important since the intumescent characteristics of a composition allows the expansion thereof, whereby upon exposure to heat an outer protective barrier is formed allowing the isolation of the inner part of the composition. The endothermic characteristics significantly increase the difference in temperature between the inner and outer parts of the composition, thereby isolating the object contained within the composition from fire and heat.

The composition of the material also includes fillers which enhance the composition's expansion and the formation of the outer protective layer. An example of such a filler is sugar molasses, which is a by-product of sugar production. Furthermore, the fillers of the present invention promote the viscosity characteristics of the composition, thereby inhibiting the composition from changing into the liquid phase.

A theoretical disadvantage of the intumescent, endothermic composition of the material of the present invention is its dependency on temperature. As the temperature rises, the composition shifts/moves towards its liquid state. Presumably, the above dependency contradicts the composition's role of protection at high temperatures. However, the composition, in fact, does act as a protective material.

The powder/particles which are a part of the composition of the present invention play a key role in retaining the composition in a semi-liquid state. Two types of temperature elevation at high temperatures are to be considered. One is a gradual, uniform elevation in which the composition may revert to the semi-liquid state it had during production, but not reaching a liquid state. The second is a quick elevation, such as would occur in the case of a fire in which the outer section of the composition becomes rigid and dry, thereby protecting the inner segment from liquefying.

The organic components of the present invention include waste products produced from filing plywood and wood. MDF and ground paper can also be used as the organic component. The porosity characteristics of the above components appear to play a key role in the absorption of the liquid hydrated salt by these components. The present inventor also found that the small size of the above components is important in enhancing the isolation provided by the heat shield composition of the present invention. In addition to the above components being inexpensive, a further advantage exists in using them since it is difficult to discard them since they are dispersed by the wind.

The present invention demonstrates that the use of small cellulose particles having low specific weight and high absorption potential permits their use in small amounts in the composition. Apparently, the small cellulose particles promote the formation of bubbles in a homogeneous manner.

The inorganic components of the present invention include vermiculite and Perlit which enhance the composition's theisdue to their low molecular weight, which is a result of high porosity and their stability at relatively high temperatures.

The present invention utilizes the small waste particles which are the waste products of processes utilizing Vermiculite and Perlit. As described in relation to the organic components, the small size of the components and their use are advantageous for the present invention.

The method the present invention for the preparation of a solid heat shield composition allows the solidification and crystallization of the hydrate salt.

The composition of the present invention has a molecular structure which is different from known isolation materials. According to the present invention, the components (hydrate salt and filler material) are heated to a temperature at which a liquid is produced. On the other hand, according to the prior art, no heat is utilized to promote bonds between the hydrate salt and therefore various binders are required to maintain the salts in close vicinity to each other.

Some of the hydrated salts of the present invention, such as aluminum sulfate, decompose when exposed to a temperature at which they liquefy, and then become soluble in the water released. Other hydrated salts of the present invention, such as magnesium nitrate hexahydrate, liquefy without the step of decomposing.

As can be seen, the present invention achieves a fused structure formed by the interactions between the hydrated salts. The above structure allows for the stability of the composition without the utilization of binders which increase the cost. In addition, the use of binders may reduce over time the stability of the solid material due to the aging of the organic binder in the presence of the hydrate fillers.

The simplified method of preparation according to the present invention also allows for a rapid solidification period of the composition enabling its use thereof shortly after the preparation process has been completed.

The uses of the composition according to the present invention are numerous. The composition can be used in the construction of buildings, safes, airplanes, automobiles, ships and the like.

BRIEF DESCRIPTION OF THE DRAWING

Embodiments of the present invention are described by way of example with reference to the accompanying drawing wherein the FIG. is a flow chart diagram representing, an embodiment of the present invention.

DETAILED DESCRIPTION OF THE DRAWING

FIG. 1 is a schematic illustration of a manufacturing line in accordance with the present invention.

Referring now to the figure, hydrated salts 10 are placed in a melting container 16 and heated by a heat source 12 to the temperature at which the solid salts become liquid. A liquid, water-based solution 14 may be added into container 16 prior to the application of heat.

When the contents of container 16 are in liquid form, the hot, liquid solution 22 is transferred to a second container 20 in which mixing means (not shown), combine said hot liquid solution with a solid, cellulose-based, organic component 18, which is preferably a waste product and with a solid inorganic granular component 22. Component 22 may include materials which promote intumescent characteristics, as well as including glass fibers (other fibers may also be used) which can increase the strength of the end product.

The contents of container 20 are then transferred in semi-liquid state 26 to a predetermined form of application. The form of application is dependent on the shape of the end product. More specifically, the mixture 26 can be applied by hand 28, spraying 30, casting 32, plate rolling 34, or by plate pressing 36.

As will be realized, mixture 26 can be applied onto Dr into numerous items. Once mixture 26 is applied and allowed to cool 38 it is in the form of a solid final product 40 which is ready for use.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention. It is understood however, that the details shown are by way of example and for purposes of illustrative discussion of preferred embodiments of the present invention only and are presented for providing what is believed to be the most useful and readily understood description of formulation procedures as well as of the principles and conceptual aspects of the invention.

EXAMPLE 1

87 wt/wt % of aluminum sulfate hydrate was heated to about 95° C.–105° C. Once a liquid state was achieved, the following components were added while mixing:

13 wt/wt % chipboard and MDF particles powder(waste product).

The resulting semi-liquid mixture was rolled into a plate and cooled for 10 minutes.

EXAMPLE 2

74 wt/wt % of aluminum sulfate hydrate was combined with 4 wt/wt % of sugar molasses, 5 wt/wt % water and heated to about 95° C.–105° C. Once a liquid state was achieved, the following components were added while mixing:

14 wt/wt % wood particles (waste product)

3 wt/wt % $Na_2B_4O_7.10H_2O$

The resulting semi-liquid mixture was pressed into a plate and cooled for 10 minutes.

EXAMPLE 3

85 wt/wt % of potassium aluminum sulfate hydrate was combined with 2 wt/wt % of water and heated to about 95° C.–105° C. Once a semi-liquid state was achieved, the following solid components were added while mixing:

11 wt/wt % MDF powder (waste product)

2 wt/wt % glass fibers

The resulting semi-liquid mixture was pressed into a plate and cooled for 10 minutes.

EXAMPLE 4

83 wt/wt % of $Na_2CO_3.7H_2O$ was combined with 7 wt/wt % water and heated to about 60° C. Once a liquid state was achieved, 8 wt/wt % wood particles were added. The semi-liquid mixture was poured into a box. Cooling was carried out at around −20° C. The resulting composition does not have intumescent characteristics, however acts as an insulator at relatively low temperatures.

EXAMPLE 5

85 wt/wt % of magnesium nitrate hexahydrate was combined with 4 wt/wt % of water and heated to about 95° C. Once a semi-liquid state was achieved, 11 wt/wt % paper powder (waste product) was added.

The resulting semi-liquid mixture was pressed into a plate and cooled for 10 minutes.

EXAMPLE 6

60 wt/wt % of aluminum sulfate 18 wt/wt % hydrate was combined with 3 wt/wt % of sugar molasses, 3 wt/wt % water, 5 wt/wt % of borax $Na_2B_4O_7.10H_2O$ and 5 wt/wt % of magnesium nitrate hexahydrate which are all mixed and heated to about 95° C–105° C. Once a semi-liquid state was achieved, the following components were added while mixing:

10 wt/wt % chip-board and MDF powder/particles (waste product)

5 wt/wt % of vermiculite waste powder 5 wt/wt % of magnesium oxide 2 wt/wt % of titanium oxide 2 wt/wt % glass fibers The resulting mixture was pressed into a mold and cooled for 10 minutes.

It will be evident to those skilled in the art that the invention is not limited to the details of the foregoing illustrative examples and that the present invention may be embodied in other specific forms without departing from the essential attributes thereof, and it is therefore disired that the present embodiments and examples be considered in all respects as illustrative and not restrictive, reference being made to the appended claims, rather than to the foregoing description, and all changes which come within the meaning and range of equivalency of the claims are therefore intended to be embraced

What is claimed is:

1. A method for preparing an endothermic heat shield composition, which comprises at least 50 wt/wt % hydrated salt and at least one filler material, said method comprising:
   a) heating the hydrated salt to a temperature at which it liquefies:
   b) adding and mixing at least one filler material into a); and cooling the mixture to form a composition wherein the hydrated salt particles are fused to each other, with the proviso that said at least one filler material is a mixture of organic and inorganic materials.

2. The method according to claim 1, wherein said hydrated salt is selected from the group consisting of $Al_2(SO_4).16-18H_2O$; $NH_4Fe(SO_4)_2.12H_2O$; $Na_2B_4O_7.10H_2O$; $NaAl(SO_4)_2.12H_2O$; $AlNH_4(SO_4)_2.12-24H_2O$; $Na_2SO_4.10H_2)O$; $MgSO_4.7H_2O$; $(NH_4)_2SO_4.12H_2O$; $KAl(SO_4)_2.12H_2O$; $Na_2SiO_3.9H_2O$; $Mg(NO_2)_2.6H_2O$; $NaNO_2$; $Na_2CO_3.7H_2O$; and mixtures thereof.

3. The method according to claim 1, wherein at least 50% of said salt is hydrate aluminum sulfate.

4. A method according to claim 1 wherein said organic component includes sugar molasses which is present in an amount of up to 20 wt/wt %.

5. A method according to claim 1, wherein said inorganic component is selected from the group consisting of glass fibers and ceramic fibers which is present in an amount of up, to 10 wt/wt %.

6. The method according to claim 1, wherein said inorganic component is inert, highly porous and light weight.

7. The method according to claim 1, wherein said inorganic component is selected from the group consisting of Vermiculite and Perlit and is present in an amount ranging from about 5 wt/wt % to 30 wt/wt %.

8. The method according to claim 1, further comprising the step or adding up to 10 wt/wt % water to the hydrated salt prior to heating.

9. The method according to claim 1, wherein inorganic component is present in an amount of up to 10 wt/wt % and it is selected from the group consisting of titanium dioxide, magnesium oxide, aluminum oxide, and mixtures thereof.

10. The method according to claim 1, wherein said organic component is a solid cellulose-based component.

11. The method according to claim 10, wherein said solid cellulose-based component in selected from the group consisting of wood particles and paper particles.

12. The method according to claims 10, wherein said solid cellulose-based component is present in an amount ranging from about 5 wt/wt % to 30 wt/wt %.

* * * * *